US012641468B2

(12) United States Patent
    Gürsu et al.

(10) Patent No.: US 12,641,468 B2
(45) Date of Patent: May 26, 2026

(54) ROBUST MOBILE TERMINAL HANDOVER

(71) Applicant: Nokia Technologies Oy, Espoo (FI)

(72) Inventors: Halit Murat Gürsu, Munich (DE);
Alperen Gundogan, Munich (DE);
Subramanya Chandrashekar,
Bangalore (IN); Ahmad Awada,
Munich (DE); Panagiotis Spapis,
Munich (DE); Ingo Viering, Munich
(DE)

(73) Assignee: NOKIA TECHNOLOGIES OY,
Espoo (FI)

( * ) Notice: Subject to any disclaimer, the term of this
patent is extended or adjusted under 35
U.S.C. 154(b) by 296 days.

(21) Appl. No.: 18/552,243

(22) PCT Filed: Mar. 30, 2021

(86) PCT No.: PCT/EP2021/058301
    § 371 (c)(1),
    (2) Date: Sep. 25, 2023

(87) PCT Pub. No.: WO2022/207081
    PCT Pub. Date: Oct. 6, 2022

(65) Prior Publication Data
    US 2024/0205782 A1     Jun. 20, 2024

(51) Int. Cl.
    *H04W 24/10*     (2009.01)
    *H04W 36/08*     (2009.01)
    *H04W 36/36*     (2009.01)

(52) U.S. Cl.
    CPC ......... *H04W 24/10* (2013.01); *H04W 36/087*
        (2023.05); *H04W 36/362* (2023.05)

(58) Field of Classification Search
    CPC .. H04W 24/10; H04W 36/087; H04W 36/362
        (Continued)

(56) References Cited

U.S. PATENT DOCUMENTS

2022/0303855 A1*   9/2022   Raymond ............... H04W 8/24
2023/0209425 A1*   6/2023   Da Silva ............... H04W 36/34
                                                        370/331

OTHER PUBLICATIONS

"Msc-generator", Sourceforge, Retrieved on Oct. 15, 2023, Webpage
available at : https://sourceforge.net/projects/msc-generator/.
                        (Continued)

*Primary Examiner* — Obaidul Huq
(74) *Attorney, Agent, or Firm* — Carter, DeLuca & Farrell
LLP

(57)     ABSTRACT

Measures for robust mobile terminal handover include, at a
distributed unit, receiving, from a centralized unit, a han-
dover message including an indication that a handover of a
terminal is to be reserved, the handover message including
handover related radio resource control (RRC) configuration
(s) corresponding to handover target cell(s) and resume
condition(s) corresponding to the handover target cell(s),
inhibiting, based on the indication, forwarding of the han-
dover related RRC reconfiguration(s) towards said terminal,
storing each of the handover related RRC reconfiguration(s),
evaluating fulfillment of each of the resume condition(s),
and if a first resume condition of the resume condition(s)
corresponding to a first handover target cell of the handover
target cell(s) is fulfilled, deciding to transmit, despite the
indication that the handover of the terminal is to be reserved,
a first handover related RRC reconfiguration of the handover
related RRC reconfiguration(s) towards the terminal.

16 Claims, 10 Drawing Sheets receiving, from a centralized unit of an access network node, a handover message including an indication indicative of that a handover of a terminal is to be reserved, the handover message including at least one handover related radio resource control reconfiguration corresponding to at least one handover target cell and at least one resume condition corresponding to said at least one handover target cell — S51 inhibiting, based on said indication, forwarding of said at least one handover related radio resource control reconfiguration towards said terminal — S52 storing each of said at least one handover related radio resource control reconfiguration — S53 evaluating fulfillment of each of said at least one resume condition — S54 deciding to, if, as a result of said evaluating, a first resume condition of said at least one resume condition corresponding to a first handover target cell of said at least one handover target cell is fulfilled, transmit, despite said indication indicative of that said handover of said terminal is to be reserved, a first handover related radio resource control reconfiguration of said at least one handover related radio resource control reconfiguration towards said terminal, wherein said first handover related radio resource control reconfiguration corresponds to said first handover target cell — S55

(58) Field of Classification Search
USPC ................................. 370/310, 328, 329, 331
See application file for complete search history.

(56) References Cited

OTHER PUBLICATIONS

"3rd Generation Partnership Project; Technical Specification Group Radio Access Network; NG-RAN; F1 application protocol (F1AP) (Release 16)", 3GPP TS 38.473, V16.4.0, Jan. 2021, pp. 1-461.
"3rd Generation Partnership Project; Technical Specification Group Radio Access Network; NG-RAN; Xn application protocol (XnAP) (Release 16)", 3GPP TS 38.423, V16.4.0, Jan. 2021, pp. 1-457.
"3rd Generation Partnership Project; Technical Specification Group Radio Access Network; NG-RAN; Architecture description (Release 16)", 3GPP TS 38.401, V16.4.0, Jan. 2021, pp. 1-78.
International Search Report and Written Opinion received for corresponding Patent Cooperation Treaty Application No. PCT/EP2021/058301, dated Nov. 9, 2021, 15 pages.
"Baseline CR for introducing Rel-16 NR mobility enhancement", 3GPP TSG-RAN WG3 Meeting #108-e, R3-204472, Intel Corporation, Jun. 1-11, 2020, 13 pages.
"Consideration on handover preparation in CHO for NR", 3GPP TSG-RAN WG3 #104, R3-193095, Agenda: 18.3, CATT, May 13-17, 2019, 2 pages.

* cited by examiner

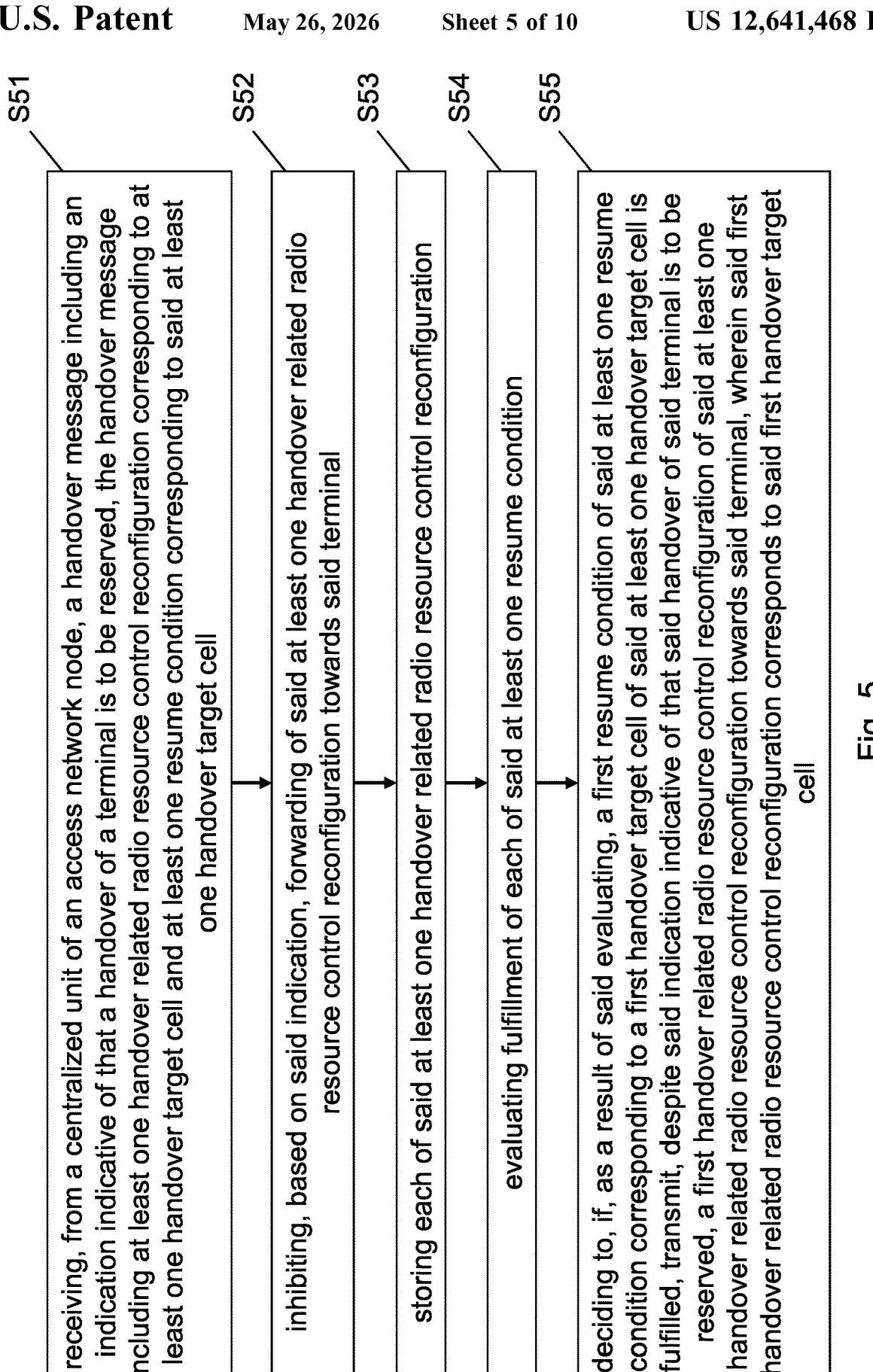

S51 receiving, from a centralized unit of an access network node, a handover message including an indication indicative of that a handover of a terminal is to be reserved, the handover message including at least one handover related radio resource control reconfiguration corresponding to at least one handover target cell and at least one resume condition corresponding to said at least one handover target cell

S52 inhibiting, based on said indication, forwarding of said at least one handover related radio resource control reconfiguration towards said terminal

S53 storing each of said at least one handover related radio resource control reconfiguration

S54 evaluating fulfillment of each of said at least one resume condition

S55 deciding to, if, as a result of said evaluating, a first resume condition of said at least one resume condition corresponding to a first handover target cell of said at least one handover target cell is fulfilled, transmit, despite said indication indicative of that said handover of said terminal is to be reserved, a first handover related radio resource control reconfiguration of said at least one handover related radio resource control reconfiguration towards said terminal, wherein said first handover related radio resource control reconfiguration corresponds to said first handover target cell

Fig. 5

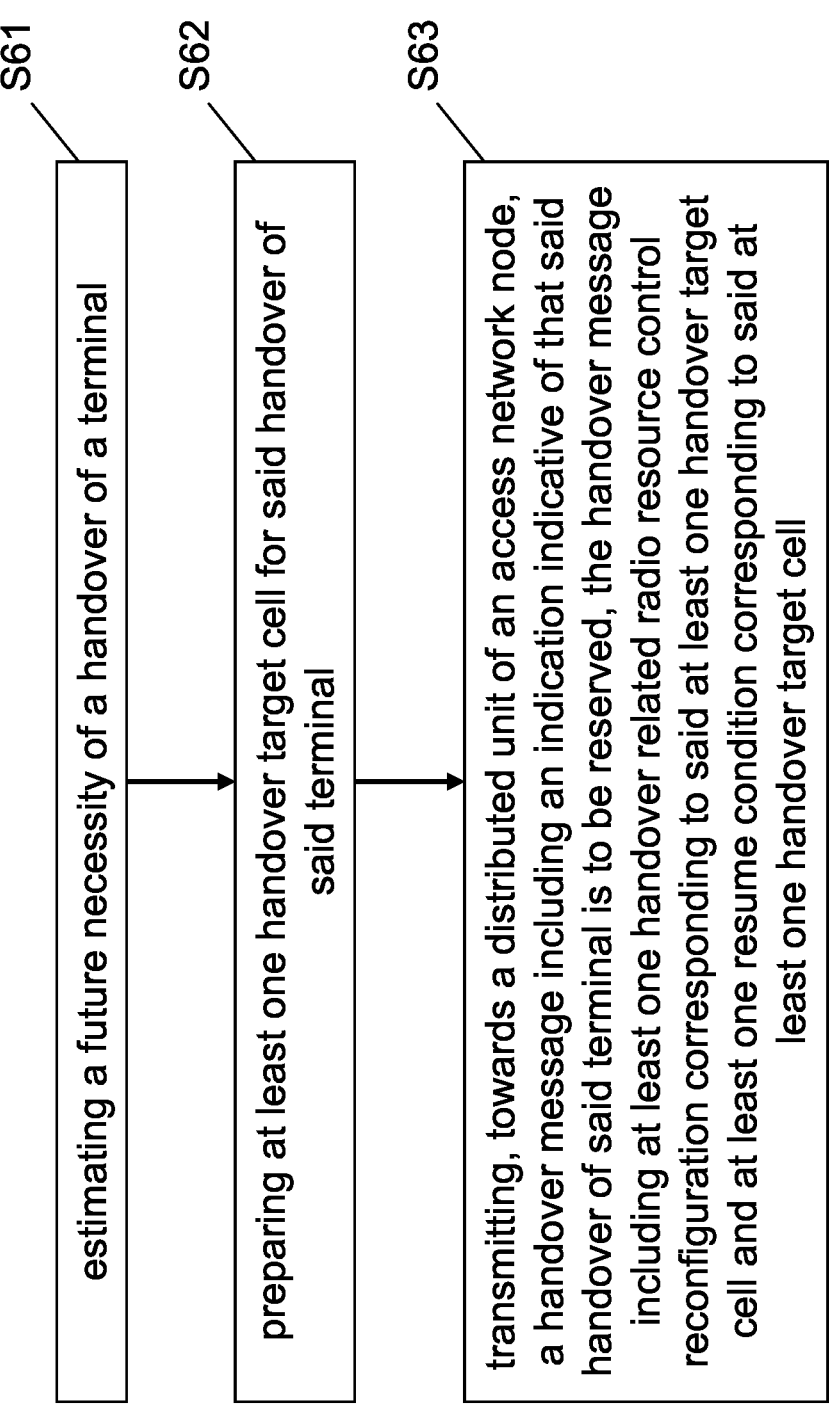

S61 estimating a future necessity of a handover of a terminal

S62 preparing at least one handover target cell for said handover of said terminal

S63 transmitting, towards a distributed unit of an access network node, a handover message including an indication indicative of that said handover of said terminal is to be reserved, the handover message including at least one handover related radio resource control reconfiguration corresponding to said at least one handover target cell and at least one resume condition corresponding to said at least one handover target cell

Fig. 6

ROBUST MOBILE TERMINAL HANDOVER

RELATED APPLICATION

This application claims priority to PCT Application No. PCT/EP2021/058301, filed on Mar. 30, 2021, which is incorporated herein by reference in its entirety.

FIELD

Various example embodiments relate to robust mobile terminal handover. More specifically, various example embodiments exemplarily relate to measures (including methods, apparatuses and computer program products) for realizing robust mobile terminal handover.

BACKGROUND

The present specification generally relates to handover control in mobile communications scenarios.

FIG. 7 shows a schematic diagram of signaling sequences in relation to terminal handover (HO), and in particular depicts the message flow for an exemplary Inter-gNB-DU mobility of a same gNB-CU, where a gNB (gNodeB) DU being a distributed unit (DU) e.g. of a base station (BS) or in general of an access network node as an example for a controlled entity and a gNB CU being a central unit (CU) e.g. of a base station or in general of an access network node as an example for a controlling entity. In a monolithic gNB (e.g. base station, or in general, access network node), the CU and DU may be collocated.

As is illustrated in FIG. 7, in the inter gNB-DU mobility scenario, a user equipment (UE, as an example of a (mobile) terminal) is reporting L1 and L3 measurements to the gNB-DU and gNB-CU, respectively. L1 beam measurements are reported to medium access control (MAC) and used for beam management in the DU and are not forwarded to the CU. On the other hand, L3 measurements (cell measurements including optionally beam measurements) are reported using a radio resource control (RRC) protocol and are used for mobility management and are forwarded to the CU.

The CU decides on triggering a mobility procedure based on received measurements. This incurs additional time, particularly in a distributed cloud deployment where there is an external F1 interface.

For instance after the UE sends the measurement report in step 1 of FIG. 7, the measurements have to be forwarded to the CU (step 2 of FIG. 7) which will then request and perform the UE context setup at the target DU (steps 3 and 4 of FIG. 7) and send an RRCReconfiguration(HO command) to the UE via the source DU (step 5 of FIG. 7). At step 6 of FIG. 7, the DU is able to forward the handover command to the UE.

The procedure depicted by steps 2 to 5 in FIG. 7 is causing additional delay for the handover decision and eventually the HO procedure in both intra and inter CU handover scenario. For intra-CU scenario, each F1 signaling takes up to approximately 5 ms and some further processing time around 1 ms. In the case of four signaling messages as illustrated in steps 2 to 5 in FIG. 7, it can be estimate that it takes up to approximately 25 ms. Such a delay of a HO procedure may cause radio link failures (RLF), as the UE may not receive on time the handover command from the network, in particular in high carrier frequency (FR2), where the radio channel may degrade fast. RLFs cause high interruption time, which is aimed to be minimized in Third Generation Partnership Project (3GPP) 5G networks, and additional signaling overhead to re-establish the radio link.

One approach to address this issue might be that the network initiates the handover earlier to compensate for the (e.g.) up to 25 ms delay, e.g. by using a larger cell individual offset. This approach, however, would face two significant challenges:

1. A suitable (in a current situation) cell individual offset would depend on many aspects (e.g. velocity, direction, etc.). Hence, even if a signaling caused delay (e.g. up to 25 ms) was known, this cannot be translated in a simple and reliable manner into a cell individual offset which fits to a current situation.

2. The delay may vary significantly, depending e.g. on the backhaul load, processing load, or capacity. Accordingly, there would be a tradeoff between the aforementioned RLF (too late initiation) and a too early initiation which would probably lead to random access channel (RACH) failures during the handover procedure ("handover failure", expiry of timer T304).

Despite the discussed delay, the above considerations do not account for additional E1 signaling (occurring during the handover preparation and before the transmission of the handover command in step 6 of FIG. 7), which is as much essential to update the target DU's DL F1-U tunnel TEID at the CU-UP.

FIG. 8 shows a schematic diagram of signaling sequences in relation to conditional terminal handover, and in particular illustrates signaling in case of inter-gNB-DU conditional handover or conditional PSCell change for intra-NR.

In conditional handover (CHO) as defined in Rel. 16, a UE is configured with a CHO command containing the target cell configuration and a condition to execute the handover for one or multiple target cells. The condition is based on radio measurements. In the CHO command, the target cell may have reserved contention free random access (CFRA) resources for the UE. When the UE evaluates the CHO condition, and the condition is fulfilled for a specific target cell, the UE applies the CHO command and may use the reserved CFRA resources to initiate the random access to the target cell (the specific target cell). The UE can be configured with multiple conditions for multiple target cells.

The CHO is designed so that a UE can do the handover without the need of the serving cell/gNB triggering the HO execution (step 6 of FIG. 7) after the measurement report (step 1 of FIG. 7).

Although CHO is useful in enhancing the mobility robustness, it has the following additional challenges and complexity compared to the baseline handover of new radio NR Rel. 15:

1. In CHO, multiple target cells may be prepared, where each target cell has to reserve radio resources for some time, which can be up to 15 s in some cases.

2. CHO is an optional feature, which may not be implemented by all UEs. In particular for these UEs it would beneficial to have a technique applied by the network to improve the mobility robustness of NR Rel. 15 handover mechanism in CU-DU (as outlined with FIG. 7) without impacting the UEs.

3. Each CHO configuration for a prepared target cell requires additional radio signaling towards the UE, i.e., RRC Reconfiguration if the preparation is performed at different time instants which is the most likely scenario.

4. CHO configurations may need to be updated with changing conditions of the prepared target cells (which may no longer be relevant to be prepared due to a degradation in radio link). Such re-configurations needs further radio and network signaling towards the UE.

5. A UE may be configured with multiple CHO conditions that it has to continuously evaluate, i.e., which poses an increased complexity for the UE.

Hence, the problem arises that an enhancement for the baseline handover of NR Rel. 15 in CU-DU architecture is needed that enhances the mobility robustness while minimizing the challenges brought up by conditional handover, i.e. which will also work for Rel. 15 UEs or UEs which have not implemented CHO.

Hence, there is a need to provide for robust mobile terminal handover.

SUMMARY

Various example embodiments aim at addressing at least part of the above issues and/or problems and drawbacks.

Various aspects of example embodiments are set out in the appended claims.

According to an exemplary aspect, there is provided a method of a distributed unit of an access network node, the method comprising receiving, from a centralized unit of said access network node, a handover message including an indication indicative of that a handover of a terminal is to be reserved, the handover message including at least one handover related radio resource control reconfiguration corresponding to at least one handover target cell and at least one resume condition corresponding to said at least one handover target cell, inhibiting, based on said indication, forwarding of said at least one handover related radio resource control reconfiguration towards said terminal, storing each of said at least one handover related radio resource control reconfiguration, evaluating fulfillment of each of said at least one resume condition, and, if, as a result of said evaluating, a first resume condition of said at least one resume condition corresponding to a first handover target cell of said at least one handover target cell is fulfilled, deciding to transmit, despite said indication indicative of that said handover of said terminal is to be reserved, a first handover related radio resource control reconfiguration of said at least one handover related radio resource control reconfiguration towards said terminal, wherein said first handover related radio resource control reconfiguration corresponds to said first handover target cell.

According to an exemplary aspect, there is provided a method of a centralized unit of an access network node, the method comprising estimating a future necessity of a handover of a terminal, preparing at least one handover target cell for said handover of said terminal, and transmitting, towards a distributed unit of said access network node, a handover message including an indication indicative of that said handover of said terminal is to be reserved, the handover message including at least one handover related radio resource control reconfiguration corresponding to said at least one handover target cell and at least one resume condition corresponding to said at least one handover target cell.

According to an exemplary aspect, there is provided an apparatus of a distributed unit of an access network node, the apparatus comprising receiving circuitry configured to receive, from a centralized unit of said access network node, a handover message including an indication indicative of that a handover of a terminal is to be reserved, the handover message including at least one handover related radio resource control reconfiguration corresponding to at least one handover target cell and at least one resume condition corresponding to said at least one handover target cell, inhibiting circuitry configured to inhibit, based on said indication, forwarding of said at least one handover related radio resource control reconfiguration towards said terminal, storing circuitry configured to store each of said at least one handover related radio resource control reconfiguration, evaluating circuitry configured to evaluate fulfillment of each of said at least one resume condition, and deciding circuitry configured to decide to, if, as a result of said evaluating, a first resume condition of said at least one resume condition corresponding to a first handover target cell of said at least one handover target cell is fulfilled, transmit, despite said indication indicative of that said handover of said terminal is to be reserved, a first handover related radio resource control reconfiguration of said at least one handover related radio resource control reconfiguration towards said terminal, wherein said first handover related radio resource control reconfiguration corresponds to said first handover target cell.

According to an exemplary aspect, there is provided an apparatus of a centralized unit of an access network node, the apparatus comprising estimating circuitry configured to estimate a future necessity of a handover of a terminal, preparing circuitry configured to prepare at least one handover target cell for said handover of said terminal, and transmitting circuitry configured to transmit, towards a distributed unit of said access network node, a handover message including an indication indicative of that said handover of said terminal is to be reserved, the handover message including at least one handover related radio resource control reconfiguration corresponding to said at least one handover target cell and at least one resume condition corresponding to said at least one handover target cell.

According to an exemplary aspect, there is provided an apparatus of a distributed unit of an access network node, the apparatus comprising at least one processor, at least one memory including computer program code, and at least one interface configured for communication with at least another apparatus, the at least one processor, with the at least one memory and the computer program code, being configured to cause the apparatus to perform receiving, from a centralized unit of said access network node, a handover message including an indication indicative of that a handover of a terminal is to be reserved, the handover message including at least one handover related radio resource control reconfiguration corresponding to at least one handover target cell and at least one resume condition corresponding to said at least one handover target cell, inhibiting, based on said indication, forwarding of said at least one handover related radio resource control reconfiguration towards said terminal, storing each of said at least one handover related radio resource control reconfiguration, evaluating fulfillment of each of said at least one resume condition, and, if, as a result of said evaluating, a first resume condition of said at least one resume condition corresponding to a first handover target cell of said at least one handover target cell is fulfilled, deciding to transmit, despite said indication indicative of that said handover of said terminal is to be reserved, a first handover related radio resource control reconfiguration of said at least one handover related radio resource control reconfiguration towards said terminal, wherein said first handover related radio resource control reconfiguration corresponds to said first handover target cell.

According to an exemplary aspect, there is provided an apparatus of a centralized unit of said access network node, the apparatus comprising at least one processor, at least one memory including computer program code, and at least one interface configured for communication with at least another apparatus, the at least one processor, with the at least one memory and the computer program code, being configured to cause the apparatus to perform estimating a future necessity of a handover of a terminal, preparing at least one handover target cell for said handover of said terminal, and transmitting, towards a distributed unit of said access network node, a handover message including an indication indicative of that said handover of said terminal is to be reserved, the handover message including at least one handover related radio resource control reconfiguration corresponding to said at least one handover target cell and at least one resume condition corresponding to said at least one handover target cell.

According to an exemplary aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient reduction of potential delay between occurrence of circumstances necessitating a handover of a terminal and actual issuance of the handover to thereby solve at least part of the problems and drawbacks identified in relation to the prior art.

By way of example embodiments, there is provided robust mobile terminal handover. More specifically, by way of example embodiments, there are provided measures and mechanisms for realizing robust mobile terminal handover.

Thus, improvement is achieved by methods, apparatuses and computer program products enabling/realizing robust mobile terminal handover.

BRIEF DESCRIPTION OF THE DRAWINGS

In the following, the present disclosure will be described in greater detail by way of non-limiting examples with reference to the accompanying drawings, in which FIG. 5 is a schematic diagram of a procedure according to example embodiments, FIG. 6 is a schematic diagram of a procedure according to example embodiments.

DETAILED DESCRIPTION

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) robust mobile terminal handover.

In particular, according to example embodiments, a technique is provided to improve mobility robustness in CU-DU architecture and to reduce the handover latency for the NR baseline handover of Rel. 15. According to example embodiments, this is achieved by using different criteria for triggering the different phases of HO (preparation and execution), while retaining all the benefits introduced by a CHO.

It is noted that although example embodiments are primarily illustrated for a distributed architecture (CU-DU architecture, external F1/E1 interfaces), example embodiments are foreseen in the context of centralized architecture (monolithic gNB) as well. In such a case, the HO preparation over Xn and the F1/E1 interfaces would be internal to the gNB.

Figure 1:
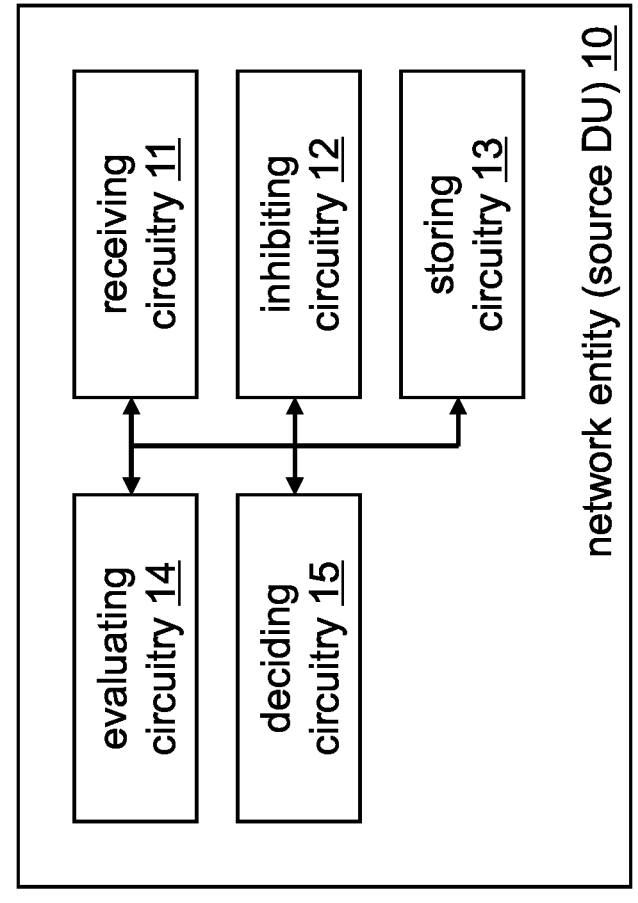
FIG. 1 is a block diagram illustrating an apparatus according to example embodiments.

FIG. 1 is a block diagram illustrating an apparatus according to example embodiments. The apparatus may be a network node or entity 10 of a distributed unit of an access network node (more generally, a controlled network entity such as a distributed unit e.g. of a base station), the apparatus comprising receiving circuitry 11, inhibiting circuitry 12, storing circuitry 13, evaluating circuitry 14, and deciding circuitry 15. The receiving circuitry 11 receives, from a centralized unit of said access network node (more generally, a controlling network entity such as a central unit e.g. of a base station), a handover message including an indication indicative of that a handover of a terminal is to be reserved, the handover message including at least one handover related radio resource control reconfiguration corresponding to at least one handover target cell and at least one resume condition corresponding to said at least one handover target cell. The inhibiting circuitry 12 inhibits, based on said indication, forwarding of said at least one handover related radio resource control reconfiguration towards said terminal. The storing circuitry 13 stores each of said at least one handover related radio resource control reconfiguration. The evaluating circuitry 14 evaluates fulfillment of each of said at least one resume condition. The deciding circuitry 15 decides to, if, as a result of said evaluating, a first resume condition of said at least one resume condition corresponding to a first handover target cell of said at least one handover target cell is fulfilled, transmit, despite said indication indicative of that said handover of said terminal is to be reserved, a first handover related radio resource control reconfiguration of said at least one handover related radio resource control reconfiguration towards said terminal. Here, said first handover related radio resource control reconfiguration corresponds to said first handover target cell. FIG. 5 is a schematic diagram of a procedure according to example embodiments. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to example embodiments comprises an operation of receiving (S51), from a centralized unit of an access network node, a handover message including an indication indicative of that a handover of a terminal is to be reserved, the handover message including at least one handover related radio resource control reconfiguration corresponding to at least one handover target cell and at least one resume condition corresponding to said at least one handover target cell, an operation of inhibiting (S52), based on said indication, forwarding of said at least one handover related radio resource control reconfiguration towards said terminal, an operation of storing (S53) each of said at least one handover related radio resource control reconfiguration, an operation of evaluating (S54) fulfillment of each of said at least one resume condition, and an operation of deciding (S55) to, if, as a result of said evaluating, a first resume condition of said at least one resume condition corresponding to a first handover target cell of said at least one handover target cell is fulfilled, transmit, despite said indication indicative of that said handover of said terminal is to be reserved, a first handover related radio resource control reconfiguration of said at least one handover related radio resource control reconfiguration towards said terminal. Here, said first handover related radio resource control reconfiguration corresponds to said first handover target cell.

Figure 2:
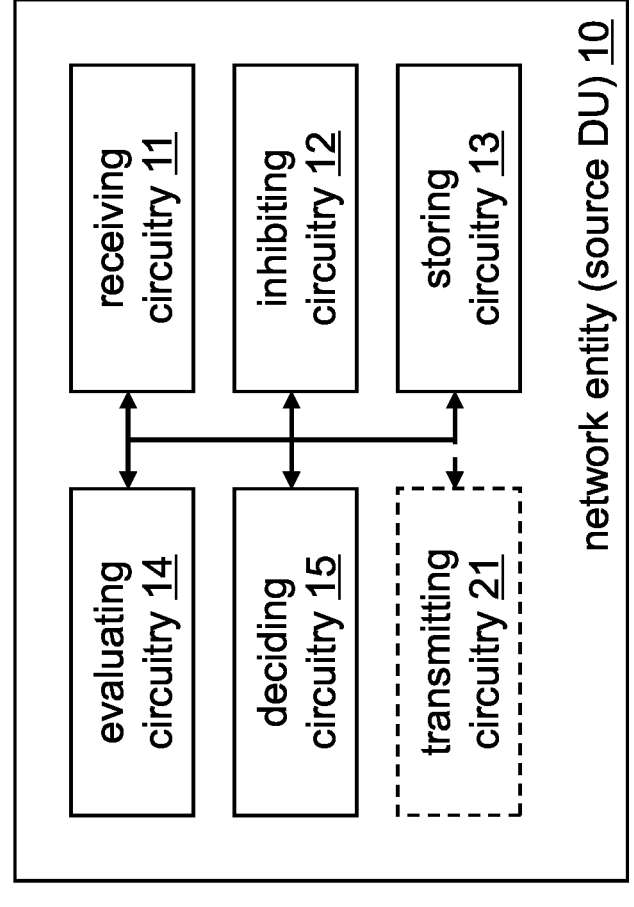
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a transmitting circuitry 21.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to further example embodiments, each of said at least one resume condition is at least one of
a threshold of exceedance of a measurement result for a current serving cell of said terminal by a measurement result for a respective handover target cell, a reception, from said terminal, of an event-triggered or periodic measurement report related to said respective handover target cell, and
a reception, from said centralized unit, of an indication to resume reserved handover of said terminal to said respective handover target cell.

According to further example embodiments, said measurement result for said current serving cell of said terminal is a Layer-1 reference signal received power based measurement result for said current serving cell of said terminal. Alternatively, or in addition, according to further example embodiments, said measurement result for said respective handover target cell is a Layer-1 reference signal received power based measurement result for said respective handover target cell.

According to further example embodiments, said measurement result for said current serving cell of said terminal is a Layer-2 filtered reference signal received power based measurement result for said current serving cell of said terminal.

Alternatively, or in addition, according to further example embodiments, said measurement result for said respective handover target cell is a Layer-2 filtered reference signal received power based measurement result for said respective handover target cell.

According to further example embodiments, said threshold of exceedance is defined by an offset value between handover target cell and serving cell measurement.

According to a variation of the procedure shown in FIG. 5, exemplary additional operations are given, which are inherently independent from each other as such. According to such variation, an exemplary method according to example embodiments may comprise an operation of transmitting, based on a result of said deciding (S55), said first handover related radio resource control reconfiguration towards said terminal.

According to a variation of the procedure shown in FIG. 5, exemplary additional operations are given, which are inherently independent from each other as such. According to such variation, an exemplary method according to example embodiments may comprise an operation of transmitting, based on a result of said deciding (S55), towards said centralized unit, an indication identifying said first handover target cell.

According to a variation of the procedure shown in FIG. 5, exemplary additional operations are given, which are inherently independent from each other as such. According to such variation, an exemplary method according to example embodiments may comprise an operation of transmitting, based on a result of said deciding (S55), towards said centralized unit, information on a downlink delivery status of said terminal.

Figure 3:
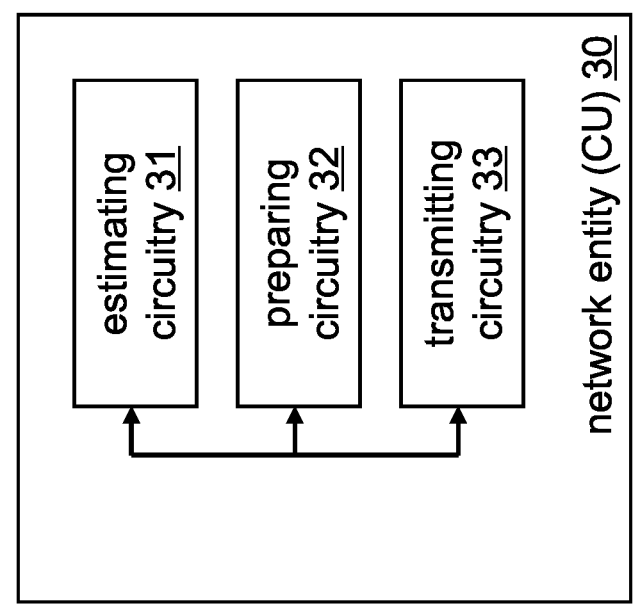
FIG. 3 is a block diagram illustrating an apparatus according to example embodiments.

FIG. 3 is a block diagram illustrating an apparatus according to example embodiments. The apparatus may be a network node or entity 30 of a centralized unit of an access network node (more generally, a controlling network entity such as a central unit e.g. of a base station), the apparatus comprising estimating circuitry 31, preparing circuitry 32, and transmitting circuitry 33. The estimating circuitry 31 estimates a future necessity of a handover of a terminal. The preparing circuitry 32 prepares at least one handover target cell for said handover of said terminal. The transmitting circuitry 33 transmits, towards a distributed unit of said access network node (more generally, a controlled network entity such as a distributed unit e.g. of a base station), a handover message including an indication indicative of that said handover of said terminal is to be reserved, the handover message including at least one handover related radio resource control reconfiguration corresponding to said at least one handover target cell and at least one resume condition corresponding to said at least one handover target cell. FIG. 6 is a schematic diagram of a procedure according to example embodiments. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to example embodiments comprises an operation of estimating (S61) a future necessity of a handover of a terminal, an operation of preparing (S62) at least one handover target cell for said handover of said terminal, and an operation of transmitting (S63), towards a distributed unit of said access network node, a handover message including an indication indicative of that said handover of said terminal is to be reserved, the handover message including at least one handover related radio resource control reconfiguration corresponding to said at least one handover target cell and at least one resume condition corresponding to said at least one handover target cell.

Figure 4:
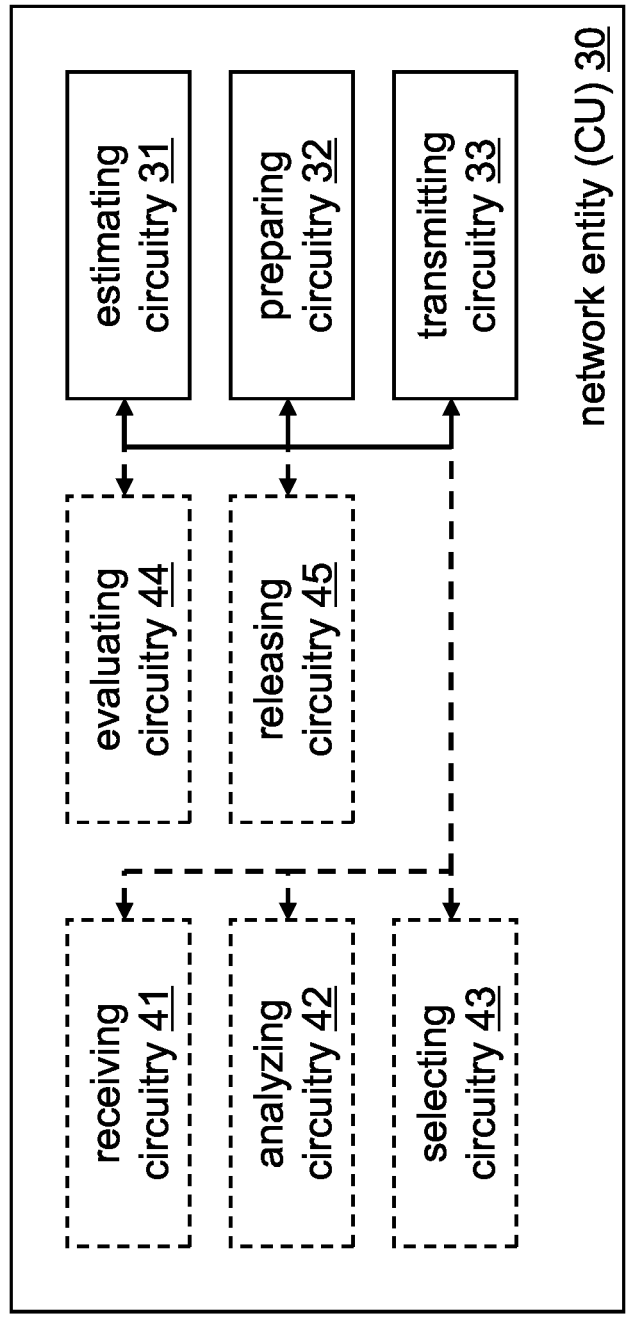
FIG. 4 is a block diagram illustrating an apparatus according to example embodiments.
Figure 7:
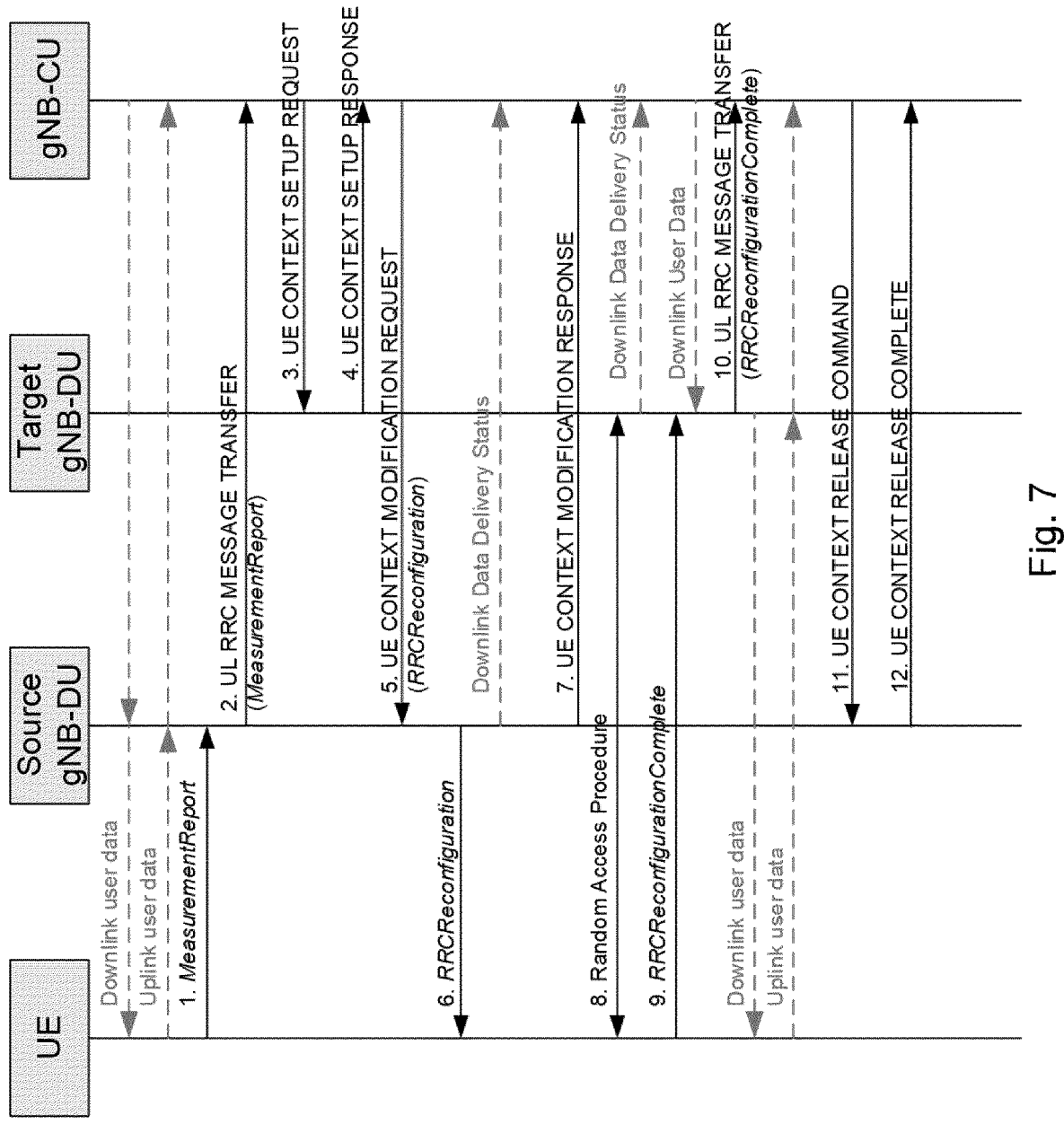
FIG. 7 shows a schematic diagram of signaling sequences in relation to terminal handover.

FIG. 4 is a block diagram illustrating an apparatus according to example embodiments. In particular, FIG. 4 illustrates a variation of the apparatus shown in FIG. 3. The apparatus according to FIG. 4 may thus further comprise a receiving circuitry 41, an analyzing circuitry 42, a selecting circuitry 43, an evaluating circuitry 44, and/or a releasing circuitry 45.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to further example embodiments, each of said at least one resume condition is at least one of a threshold of exceedance of a measurement result for a current serving cell of said terminal by a measurement result for a respective handover target cell, a reception, from said terminal, of an event-triggered or periodic measurement report related to said respective handover target cell, and a reception, from said centralized unit, of an indication to resume reserved handover of said terminal to said respective handover target cell.

According to further example embodiments, said measurement result for said current serving cell of said terminal is a Layer-1 reference signal received power based measurement result for said current serving cell of said terminal. Alternatively, or in addition, according to further example embodiments, said measurement result for said respective handover target cell is a Layer-1 reference signal received power based measurement result for said respective handover target cell.

According to further example embodiments, said measurement result for said current serving cell of said terminal is a Layer-2 filtered reference signal received power based measurement result for said current serving cell of said terminal.

Alternatively, or in addition, according to further example embodiments, said measurement result for said respective handover target cell is a Layer-2 filtered reference signal received power based measurement result for said respective handover target cell.

According to further example embodiments, said threshold of exceedance is defined by an offset value between handover target cell and serving cell measurement.

According to a variation of the procedure shown in FIG. 6, exemplary additional operations are given, which are inherently independent from each other as such. According to such variation, an exemplary method according to example embodiments may comprise an operation of transmitting, towards said distributed unit, said indication to resume reserved handover of said terminal to a selected handover target cell of said at least one handover target cell.

According to a variation of the procedure shown in FIG. 6, exemplary additional operations are given, which are inherently independent from each other as such. According to such variation, an exemplary method according to example embodiments may comprise an operation of receiving a Layer-3 measurement result indicative of a first handover target cell of said at least one handover target cell, an operation of analyzing said Layer-3 measurement result indicative of said first handover target cell, and an operation of selecting, based on a result of said analyzing, said first handover target cell as said selected handover target cell.

According to a variation of the procedure shown in FIG. 6, exemplary details of the estimating operation (S61) are given, which are inherently independent from each other as such. Such exemplary estimating operation (S61) according to example embodiments may comprise an operation of receiving a Layer-3 measurement result indicative of a current serving cell of said terminal, and an operation of evaluating said Layer-3 measurement result indicative of said current serving cell of said terminal.

According to a variation of the procedure shown in FIG. 6, exemplary details of the preparing operation (S62) are given, which are inherently independent from each other as such. Such exemplary preparing operation (S62) according to example embodiments may comprise an operation of transmitting, towards at least one target distributed unit corresponding to said at least one handover target cell, a context setup request, and an operation of receiving, from said at least one target distributed unit corresponding to said at least one handover target cell, a context setup response.

According to a variation of the procedure shown in FIG. 6, exemplary additional operations are given, which are inherently independent from each other as such. According to such variation, an exemplary method according to example embodiments may comprise an operation of receiving, from said distributed unit, an indication identifying a resumed handover target cell of said at least one handover target cell.

According to a variation of the procedure shown in FIG. 6, exemplary additional operations are given, which are inherently independent from each other as such. According to such variation, an exemplary method according to example embodiments may comprise an operation of releasing said at least one handover target cell different from said resumed handover target cell from preparation for said handover of said terminal.

According to a variation of the procedure shown in FIG. 6, exemplary details of the releasing operation are given, which are inherently independent from each other as such. Such exemplary releasing operation according to example embodiments may comprise an operation of transmitting, towards said at least one target distributed unit corresponding to said at least one handover target cell different from said resumed handover target cell, a context release request, and an operation of receiving, from said at least one target distributed unit corresponding to said at least one handover target cell different from said resumed handover target cell, a context release response.

According to a variation of the procedure shown in FIG. 6, exemplary additional operations are given, which are inherently independent from each other as such. According to such variation, an exemplary method according to example embodiments may comprise an operation of receiving, from said distributed unit, information on a downlink delivery status of said terminal.

Example embodiments outlined above are described below in more detail.

Namely, according to example embodiments, after a CU-CP (central unit control plane (entity)) receives a L3 RRC measurement report and makes, based thereon, a pro-active decision to handover the UE, the CU-CP prepares one or more target DUs consisting of one or more target cells. The signaling for HO preparation being the same as in a CHO scenario (i.e., FIG. 8—steps 1 to 4).

In such case, according to example embodiments, the CU-CP sends to the source DU a "Paused HO" (PHO) indication (as an example for an indication indicative of that a handover of a terminal is to be reserved) along with the DL F1 message which includes the RRC Reconfiguration (as an example for a handover related radio resource control reconfiguration) for each target cell the CU-CP has prepared and a "Resume HO" condition (as an example for a resume condition) for an intra- or inter-CU HO (e.g. for each target cell the CU-CP has prepared).

A HO command with an enabled "PHO" indication means that the source DU does not forward the HO command directly to the UE but waits for the Resume HO condition to hold, i.e., to be fulfilled.

According to example embodiments, the "Resume HO" condition can be based on L1 reference signal received power (RSRP) measurements that are reported periodically by the UE to the DU for serving and non-serving cell (as enabled in Rel. 17) or reported in an event-triggered manner to the DU (e.g., if allowed in future 3GPP releases).

If based on periodic L1 measurements, according to example embodiments, the "Resume HO" condition provided by the CU may include offsets/threshold to compare the measurements of the serving cell and target cell and possibly Time-to-Trigger (TTT), meaning that the condition has to be fulfilled for a certain interval (TTT).

If based on event-triggered L1 measurements, according to example embodiments, the "Resume HO" condition is an indication from the CU to the DU to trigger the transmission of the RRC Reconfiguration containing the handover command upon the reception of new L1 measurement report from the UE, the measurement report indicating the ID of the target cell to which the handover shall be executed.

According to example embodiments, the "Resume HO" condition discussed above (i.e., if based on periodic L1 measurements or if based on event-triggered L1 measurements) are based on a filtered value of L1 beam measurements. Herein, the DU (if based on periodic L1 measurements) or UE (if based on event-triggered L1 measurements) performs an additional filtering for the L1 received measurements (called herein L2 filtering), before the DU evaluates the "Resume HO" condition.

According to example embodiments, the "Resume HO" condition is that an indication containing the ID of the target cell is received from the CU. In such case, the source DU is thus asked by the CU to send to UE the handover command which has been paused upon receiving the indication containing the ID of the target cell from the CU. According to example embodiments, the indication from the CU is triggered (at the CU) upon the reception of another L3 measurement report from the UE indicating the target cell to which the handover shall be executed.

According to example embodiments, the "PHO" indication is an optional information element IE in a HO command. In case the IE is missing in the HO command, the HO works as legacy, in other words, the DU interprets the HO command so as to immediately perform the handover of the UE in line with the HO command.

Upon receiving an RRC Reconfiguration with "PHO" indication set, according to example embodiments, the DU stores the RRC message and evaluates the "Resume HO" conditions received for each prepared target cell.

Once the "Resume HO" condition for a target cell is met, according to example embodiments, the DU resumes the paused HO with the "PHO" indication for the target cell that satisfies the "Resume HO" condition, and the DU sends the RRCReconfiguration message to the UE for that cell.

In such case, according to example embodiments, the DU signals to the CU-CP the ID of the target cell for which the "Resume HO" condition has been fulfilled, i.e., for which the "PHO" has been resumed.

According to further example embodiments, upon receipt of this indication, the CU-CP signals all other target cells to release the preparation (the radio resources that have been reserved for the handed over UE).

Example embodiments are explained below in more concrete terms.

Figure 9:
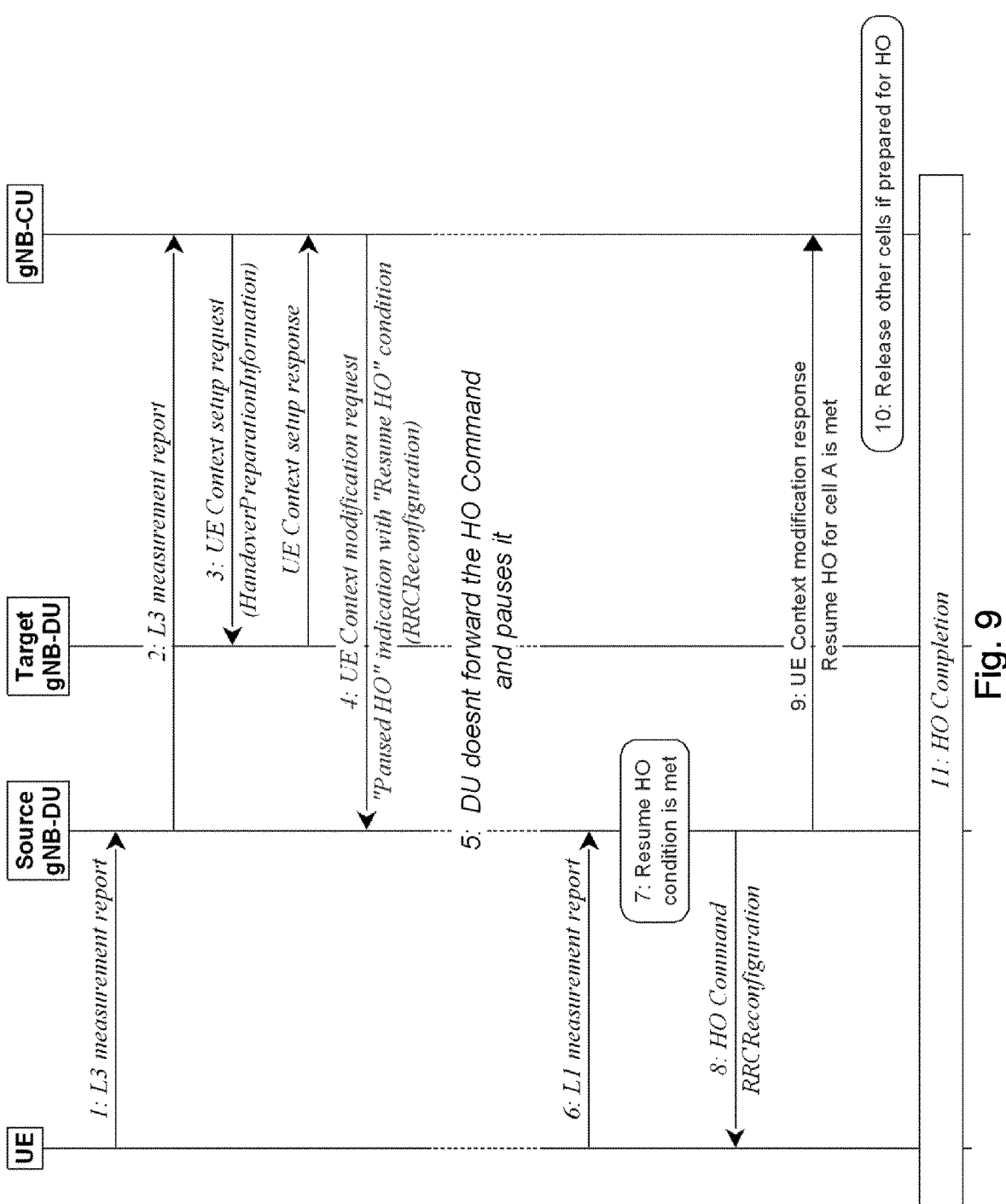
FIG. 9 shows a schematic diagram of signaling sequences according to example embodiments.

FIG. 9 shows a schematic diagram of signaling sequences according to example embodiments.

In a step 1 of FIG. 9, according to example embodiments, the UE reports L3 measurements to the DU as set by the measurement configuration.

In a step 2 of FIG. 9, according to example embodiments, the DU forwards the L3 measurements to the CU without decoding the L3 measurements.

Thereafter, according to example embodiments, the CU evaluates the L3 measurements for PHO decision.

For a PHO decision, the CU may use the same evaluations for L3 measurements as it uses to initiate CHO:

$$L3n > L3s + \text{Offset\_CHO}$$

On the other hand, for the PHO decision, the CU may use more aggressive thresholds, as a PHO can be easily revoked by the network without the need to reconfigure the UE:

$$L3n > L3s + \text{Offset\_CHO} - \text{Offset\_PHO}$$

Figure 8:
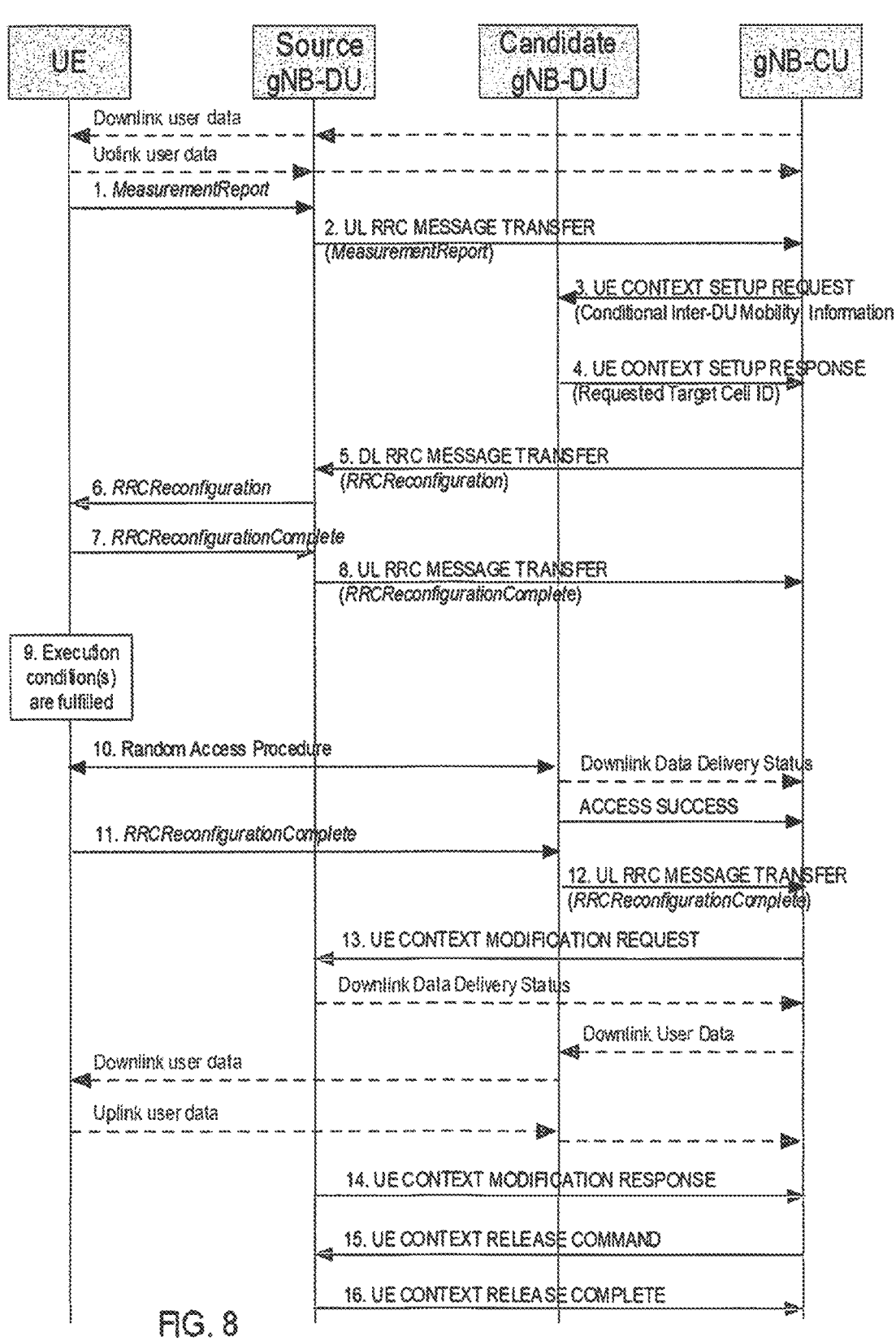
FIG. 8 shows a schematic diagram of signaling sequences in relation to conditional terminal handover.

In a step 3 of FIG. 9, according to example embodiments, the UE context setup request and UE context setup response follow the CHO procedure (i.e., similar as illustrated in steps 3 and 4 of FIG. 8).

In a step 4 of FIG. 9, according to example embodiments, the CU sends the PHO indication along with a resume condition to the DU.

According to example embodiments, the resume condition can be based on L1 RSRP measurements of serving and non-serving beams.

If reported periodically by the UE, the DU evaluates the resume condition $$L1n > L1s + \text{Offset\_PHO}$$

and sends the paused handover command, if the resume condition is met for a specific target cell.

On the other hand, if reported in an event triggered manner by the UE (i.e., when L1n>L1s+Offset_PHO is met at the UE), the DU sends the paused handover command when receiving the L1 measurement reported from the UE.

According to example embodiments, the resume condition can be based on L2 filtered RSRP measurements instead of L1 RSRP measurements, i.e., according to example embodiments, additional L2 filtering is applied by the serving DU in case of periodic L1 reporting or by the UE in case of event triggered L1 reporting.

According to example embodiments, the resume condition can be an indication that is received from the CU to trigger the handover command transmission for a specific target cell.

According to further example embodiments, the resume condition can be a beam failure recovery initiated by UE on beam "x" and/or L1s<Thr and/or L1n>Thr and/or L1n>L1s+Offset. Here, beam "x" can be at the border of a neighbor cell and UE will move to neighbor cell quickly after it recovers on beam "x".

It is noted that according to example embodiments, the CU sends multiple PHO indications for multiple target cells.

In a step 5 of FIG. 9, according to example embodiments, the DU starts monitoring the resume condition and does not forward the HO command to the UE.

In a step 6 of FIG. 9, according to example embodiments, while the UE being unaware of the PHO indication, the UE keeps on reporting L1/L3 measurements to the DU/CU.

In a step 7 of FIG. 9, according to example embodiments, the DU detects that a PHO condition is met.

In a step 8 of FIG. 9, according to example embodiments, the DU resumes the handover and sends the HO command to the UE for the target cell corresponding to the met PHO condition. In particular, according to example embodiments, the DU transmits the paused HO commands as in the legacy HO.

In a step 9 of FIG. 9, according to example embodiments, the DU informs the CU about the identity of the target cell, for which the resume condition is met, i.e., for which the paused HO is resumed. In the course thereof, according to example embodiments, the DU informs the CU about the downlink delivery status of the UE. In response thereto, the CU can start forwarding DL packets to the target cell.

In a step 10 of FIG. 9, according to example embodiments, the other prepared cells are released by the CU. In an intra-CU HO scenario, the CU releases the prepared cells in DUs by informing the prepared cells directly. On the other hand, in an inter-CU HO scenario, the CU informs the other gNB via Xn interface about the release of prepared cells. According to example embodiments, this procedure may follow the CHO procedure defined to release the conditional handover preparation over Xn interface.

In a step 11 of FIG. 9, according to example embodiments, the UE initiates the random access to the target cell and the legacy handover procedure is followed from this point on and completed.

Consequently, according to example embodiments, a network-based solution is achieved, that can provide mobility robustness in CU-DU architecture also for UEs that do not support conditional handover, where at least some of the following advantages are obtained.

Namely, advantageously, network related re-configurations of the handover command are not signaled to the UE (not needed), which saves signaling. This enables more frequent preparations of CHO configuration and releases. This in turn results in less booking of CFRA resources.

Further, advantageously, handover execution can be based on L1 RSRP measurements, which are faster to track the channel degradation than L3 measurements.

Further, advantageously, relying on L1 RSRP measurements for handover execution implies reduced latency in HO procedure, such that robustness is even strengthened.

Further, advantageously, even though multiple target cells are prepared at the network side, a delayed HO execution implies that the HO command is delivered only for the correct target cell, such that network traffic towards the UE is reduced.

Further, advantageously, demerits of a CHO are discarded without compromising the mobility robustness advantage brought up by CHO.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 10:
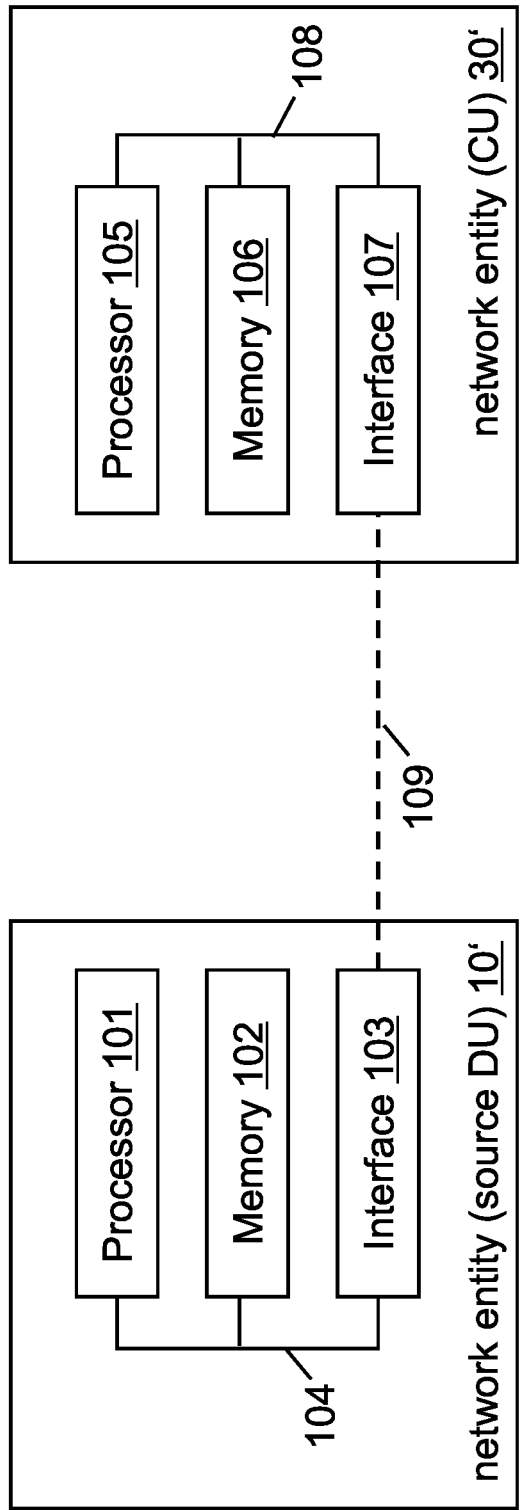
FIG. 10 is a block diagram alternatively illustrating apparatuses according to example embodiments.

In FIG. 10, an alternative illustration of apparatuses according to example embodiments is depicted. As indicated in FIG. 10, according to example embodiments, the apparatus (network entity) 10' (corresponding to the network entity 10) comprises a processor 101, a memory 102 and an interface 103, which are connected by a bus 104 or the like. Further, according to example embodiments, the apparatus (network entity) 30' (corresponding to the network entity 30) comprises a processor 105, a memory 106 and an interface 107, which are connected by a bus 108 or the like, and the apparatuses may be connected via link 109, respectively.

The processor 101/105 and/or the interface 103/107 may also include a modem or the like to facilitate communication over a (hardwire or wireless) link, respectively. The interface 103/107 may include a suitable transceiver coupled to one or more antennas or communication means for (hardwire or wireless) communications with the linked or connected device(s), respectively. The interface 103/107 is generally configured to communicate with at least one other apparatus, i.e. the interface thereof.

The memory 102/106 may store respective programs assumed to include program instructions or computer program code that, when executed by the respective processor, enables the respective electronic device or apparatus to operate in accordance with the example embodiments.

In general terms, the respective devices/apparatuses (and/ or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the network entity 10 comprises at least one processor 101, at least one memory 102 including computer program code, and at least one interface 103 configured for communication with at least another apparatus. The processor (i.e. the at least one processor 101, with the at least one memory 102 and the computer program code) is configured to perform receiving, from a centralized unit of an access network node, a handover message including an indication indicative of that a handover of a terminal is to be reserved, the handover message including at least one handover related radio resource control reconfiguration corresponding to at least one handover target cell and at least one resume condition corresponding to said at least one handover target cell (thus the apparatus comprising corresponding means for receiving), to perform inhibiting, based on said indication, forwarding of said at least one handover related radio resource control reconfiguration towards said terminal (thus the apparatus comprising corresponding means for inhibiting), to perform storing each of said at least one handover related radio resource control reconfiguration (thus the apparatus comprising corresponding means for storing), to perform evaluating fulfillment of each of said at least one resume condition (thus the apparatus comprising corresponding means for evaluating), and to perform deciding to, if, as a result of said evaluating, a first resume condition of said at least one resume condition corresponding to a first handover target cell of said at least one handover target cell is fulfilled, transmit, despite said indication indicative of that said handover of said terminal is to be reserved, a first handover related radio resource control reconfiguration of said at least one handover related radio resource control reconfiguration towards said terminal, wherein said first handover related radio resource control reconfiguration corresponds to said first handover target cell (thus the apparatus comprising corresponding means for deciding).

Further, according to example embodiments, an apparatus representing the network entity 30 comprises at least one processor 105, at least one memory 106 including computer program code, and at least one interface 107 configured for communication with at least another apparatus. The processor (i.e. the at least one processor 105, with the at least one memory 106 and the computer program code) is configured to perform estimating a future necessity of a handover of a terminal (thus the apparatus comprising corresponding means for estimating), to perform preparing at least one handover target cell for said handover of said terminal (thus the apparatus comprising corresponding means for preparing), and to perform transmitting, towards a distributed unit of an access network node, a handover message including an indication indicative of that said handover of said terminal is to be reserved, the handover message including at least one handover related radio resource control reconfiguration corresponding to said at least one handover target cell and at least one resume condition corresponding to said at least one handover target cell (thus the apparatus comprising corresponding means for transmitting).

For further details regarding the operability/functionality of the individual apparatuses, reference is made to the above description in connection with any one of FIGS. 1 to 9, respectively.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for robust mobile terminal handover. Such measures exemplarily comprise, at a distributed unit of an access network node, receiving, from a centralized unit of said access network node, a handover message including an indication indicative of that a handover of a terminal is to be reserved, the handover message including at least one handover related radio resource control reconfiguration corresponding to at least one handover target cell and at least one resume condition corresponding to said at least one handover target cell, inhibiting, based on said indication, forwarding of said at least one handover related radio resource control reconfiguration towards said terminal, storing each of said at least one handover related radio resource control reconfiguration, evaluating fulfillment of each of said at least one resume condition, and if, as a result of said evaluating, a first resume condition of said at least one resume condition corresponding to a first handover target cell of said at least one handover target cell is fulfilled, deciding to transmit, despite said indication indicative of that said handover of said terminal is to be reserved, a first handover related radio resource control reconfiguration of said at least one handover related radio resource control reconfiguration towards said terminal, wherein said first handover related radio resource control reconfiguration corresponds to said first handover target cell.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP Third Generation Partnership Project
BS base station
CFRA contention free random access
CHO conditional handover
CU central unit
CU-CP central unit control plane
DU distributed unit
gNB gNodeB
HO handover
MAC medium access control
PHO Paused HO
RA random access
RACH random access channel
RLF radio link failure
RRC radio resource control
RSRP reference signal received power
SR scheduling request
TTT Time-to-Trigger
UE user equipment
UL uplink

The invention claimed is:

1. A method of a distributed unit of an access network node, the method comprising receiving, from a centralized unit of said access network node, a handover message including an indication indicative of that a handover of a terminal is to be reserved, the handover message including at least one handover related radio resource control reconfiguration corresponding to at least one handover target cell and at least one resume condition corresponding to said at least one handover target cell, inhibiting, based on said indication, forwarding of said at least one handover related radio resource control reconfiguration towards said terminal, storing each of said at least one handover related radio resource control reconfiguration, evaluating fulfillment of each of said at least one resume condition, and if, as a result of said evaluating, a first resume condition of said at least one resume condition corresponding to a first handover target cell of said at least one handover target cell is fulfilled, deciding to transmit, despite said indication indicative of that said handover of said terminal is to be reserved, a first handover related radio resource control reconfiguration of said at least one handover related radio resource control reconfiguration towards said terminal, wherein said first handover related radio resource control reconfiguration corresponds to said first handover target cell.

2. The method according to claim 1, wherein each of said at least one resume condition is at least one of a threshold of exceedance of a measurement result for a current serving cell of said terminal by a measurement result for a respective handover target cell, a reception, from said terminal, of an event-triggered or periodic measurement report related to said respective handover target cell, and a reception, from said centralized unit, of an indication to resume reserved handover of said terminal to said respective handover target cell.

3. The method according to claim 2, wherein said measurement result for said current serving cell of said terminal is a Layer-1 reference signal received power based measurement result for said current serving cell of said terminal, and/or said measurement result for said respective handover target cell is a Layer-1 reference signal received power based measurement result for said respective handover target cell.

4. The method according to claim 2, wherein said measurement result for said current serving cell of said terminal is a Layer-2 filtered reference signal received power based measurement result for said current serving cell of said terminal, and/or said measurement result for said respective handover target cell is a Layer-2 filtered reference signal received power based measurement result for said respective handover target cell.

5. The method according to any of claim 2, wherein said threshold of exceedance is defined by an offset value between handover target cell and serving cell measurement.

6. The method according to claim 1, further comprising transmitting, based on a result of said deciding, said first handover related radio resource control reconfiguration towards said terminal.

7. The method according to claim 1, further comprising transmitting, based on a result of said deciding, towards said centralized unit, an indication identifying said first handover target cell.

8. The method according to claim 1, further comprising transmitting, based on a result of said deciding, towards said centralized unit, information on a downlink delivery status of said terminal.

9. An apparatus of a distributed unit of an access network node, the apparatus comprising at least one processor, at least one memory including computer program code, and at least one interface configured for communication with at least another apparatus, the at least one processor, with the at least one memory and the computer program code, being configured to cause the apparatus to perform:

receiving, from a centralized unit of said access network node, a handover message including an indication indicative of that a handover of a terminal is to be reserved, the handover message including at least one handover related radio resource control reconfiguration corresponding to at least one handover target cell and at least one resume condition corresponding to said at least one handover target cell, inhibiting, based on said indication, forwarding of said at least one handover related radio resource control reconfiguration towards said terminal, storing each of said at least one handover related radio resource control reconfiguration, evaluating fulfillment of each of said at least one resume condition, and if, as a result of said evaluating, a first resume condition of said at least one resume condition corresponding to a first handover target cell of said at least one handover target cell is fulfilled, deciding to transmit, despite said indication indicative of that said handover of said terminal is to be reserved, a first handover related radio resource control reconfiguration of said at least one handover related radio resource control reconfiguration towards said terminal, wherein said first handover related radio resource control reconfiguration corresponds to said first handover target cell.

10. The apparatus according to claim 9, wherein each of said at least one resume condition is at least one of a threshold of exceedance of a measurement result for a current serving cell of said terminal by a measurement result for a respective handover target cell, a reception, from said terminal, of an event-triggered or periodic measurement report related to said respective handover target cell, and a reception, from said centralized unit, of an indication to resume reserved handover of said terminal to said respective handover target cell.

11. The apparatus according to claim 10, wherein said measurement result for said current serving cell of said terminal is a Layer-1 reference signal received power based measurement result for said current serving cell of said terminal, and/or said measurement result for said respective handover target cell is a Layer-1 reference signal received power based measurement result for said respective handover target cell.

12. The apparatus according to claim 10, wherein said measurement result for said current serving cell of said terminal is a Layer-2 filtered reference signal received power based measurement result for said current serving cell of said terminal, and/or said measurement result for said respective handover target cell is a Layer-2 filtered reference signal received power based measurement result for said respective handover target cell.

13. The apparatus according to claim 10, wherein said threshold of exceedance is defined by an offset value between handover target cell and serving cell measurement.

14. The apparatus according to claim 9, wherein the at least one processor, with the at least one memory and the computer program code, being configured to cause the apparatus to perform:

transmitting, based on a result of said deciding, said first handover related radio resource control reconfiguration towards said terminal.

15. The apparatus according to claim 9, wherein the at least one processor, with the at least one memory and the computer program code, being configured to cause the apparatus to perform:

transmitting, based on a result of said deciding, towards said centralized unit, an indication identifying said first handover target cell.

16. The apparatus according to claim 9, wherein the at least one processor, with the at least one memory and the computer program code, being configured to cause the apparatus to perform:

transmitting, based on a result of said deciding, towards said centralized unit, information on a downlink delivery status of said terminal.

* * * * *